United States Patent [19]

Morgan, Jr.

[11] 4,322,293
[45] Mar. 30, 1982

[54] MULTIPLE ELEMENT FILTER

[76] Inventor: Howard W. Morgan, Jr., P.O. Box 622, Michigan City, Ind. 46360

[21] Appl. No.: 235,912

[22] Filed: Feb. 19, 1981

[51] Int. Cl.³ .............................................. B01D 29/30
[52] U.S. Cl. ................................ 210/232; 210/323.2; 210/345
[58] Field of Search ............. 210/232, 244, 246, 323.2, 210/322, 456, 469, 479, 345

[56] References Cited

U.S. PATENT DOCUMENTS

| | | | |
|---|---|---|---|
| 420,136 | 1/1890 | Willis | 210/345 X |
| 2,387,368 | 10/1945 | Vokes | 210/323.2 |
| 4,022,693 | 5/1977 | Morgan, Jr. | 210/345 |

*Primary Examiner*—John Adee
*Attorney, Agent, or Firm*—Oltsch, Knoblock & Hall

[57] ABSTRACT

In a filter for liquids including a housing which suspends multiple filtering elements and a cover. A grid is carried by the lower peripheral edge of the cover which overlies and holds the filtering elements in place when the cover is in sealing contact with the filter housing.

2 Claims, 5 Drawing Figures

MULTIPLE ELEMENT FILTER

SUMMARY OF THE INVENTION

The invention of this application relates to a liquid filter which includes means carried by the cover for the filter housing by which the filter elements are retained within the housing.

Multiple element filters of this nature are shown in U.S. Pat. No. 4,022,693. The cover of such a filter is used to overlie and retain the filter elements which are supported by the filter housing. While this is an effective way to retain the filter elements, the location and number of elements is somewhat limited.

The filter of this invention includes a housing having an upper wall with a plurality of openings therein for supporting filtering elements. The filter also includes a cover which seals against the housing in its closed position. The cover has a dome-shaped inner face and carries a grid at its lower peripheral edge. The grid is open and presses against the filter elements at their upper ends to retain them in position when the cover is closed. The liquid entering the filter flows from an inlet passageway into the domed area under the cover, through the grid openings, and through the filtering elements into the housing body for removal via an outlet passageway. The grid provides the capability of retaining various patterns of filter element arrangements in the housing top wall without regard to number or precise location of the elements.

Accordingly, it is an object of this invention to provide an improved multiple element liquid filter.

Another object of this invention is to provide a liquid filter having a grid carried by the cover of the filter for retaining filter elements in place when the cover is closed.

Still another object of this invention is to provide a liquid filter having a capacity to retain various arrangements of filter elements in the filter housing.

Other objects of this invention will become apparent upon a reading of the invention's description.

DESCRIPTION OF THE PREFERRED EMBODIMENT

Figure 1:
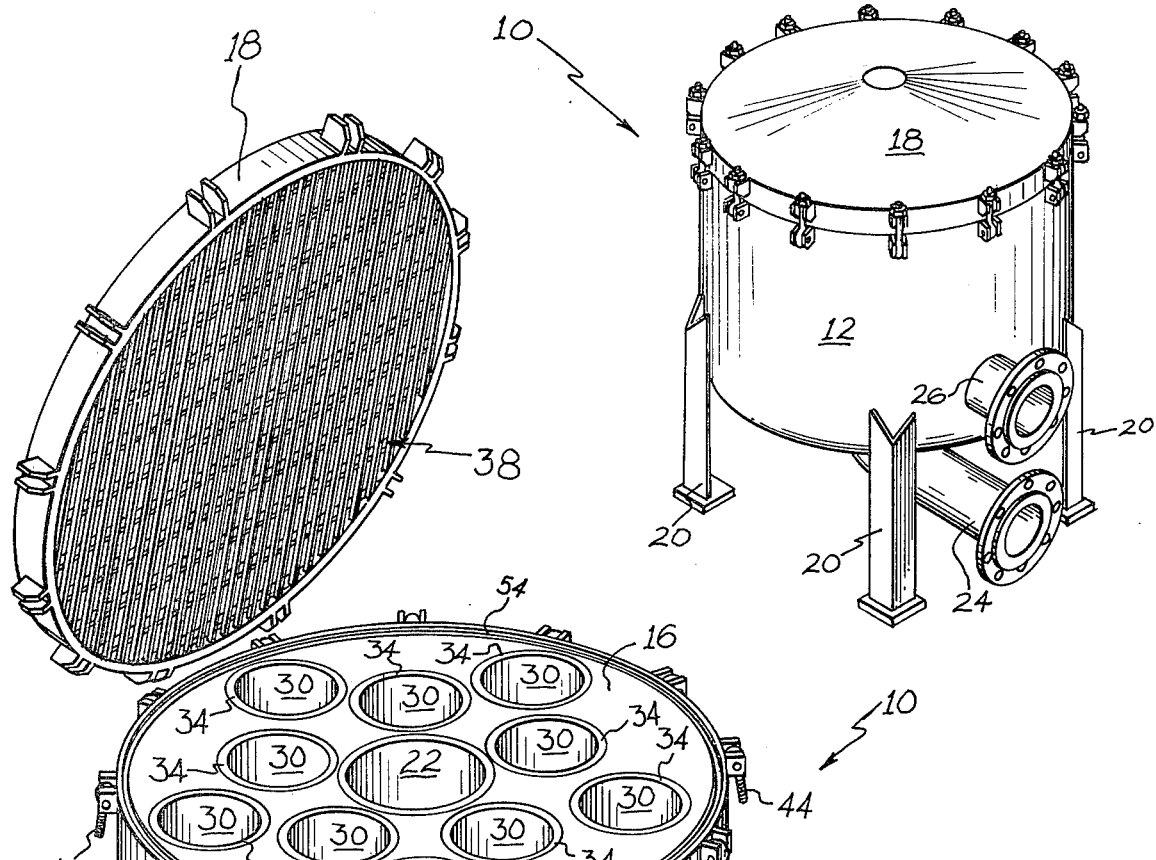
FIG. 1 is a perspective view of the filter of this invention with the cover closed.
Figure 2:
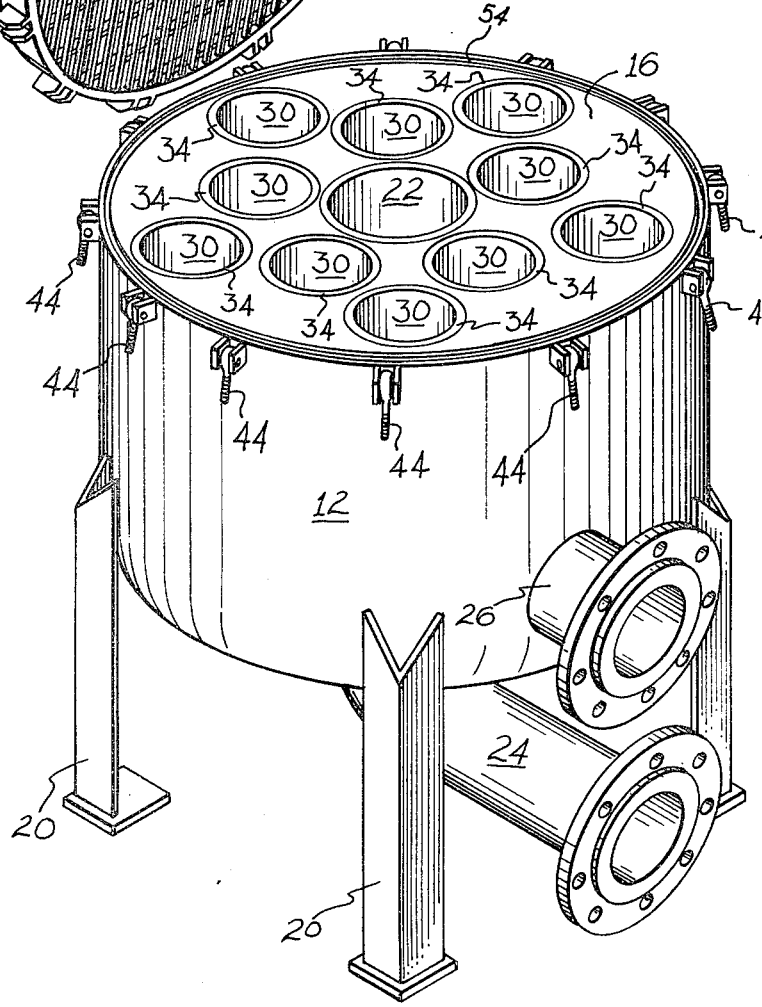
FIG. 2 is a perspective view of the filter with the cover removed.
Figure 3:
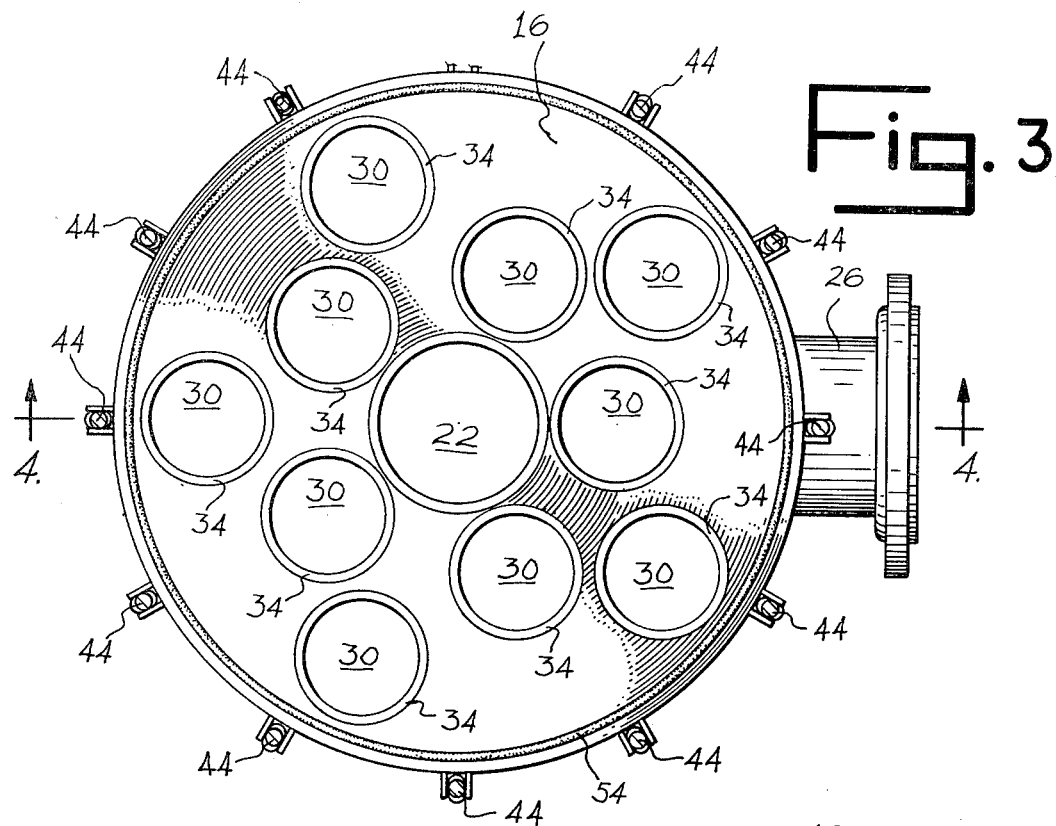
FIG. 3 is a top plan view of the filter with the cover removed.

The preferred embodiment illustrated is not intended to be exhaustive nor to limit the invention to the precise form disclosed. It is chosen and described in order to explain the principles of the invention and its application and practical use to thereby enable others skilled in the art to best utilize the invention.

The multiple element filter 10 of this application is a filter for liquids. Filter 10 includes a body which is generally cylindrically shaped and which includes a side wall 12, a lower wall 14 and an upper wall 16. A cover 18 is adapted to overlie upper wall 16. The body of filter 10 is supported by legs 20 attached to side wall 12. Upper wall 16 has a central opening 22 which serves as an inlet passageway for liquids entering the filter through an inlet pipe 24. Pipe 24 enters filter 10 in a sealed manner through lower wall 14 and extends vertically into opening 22 in upper wall 16. A second pipe 26 serves as an outlet passage for liquids and communicates with the interior of filter 10 through side wall 12 at lower wall 14. Upper wall 16 has a series of openings 28 formed in it which are located circumferentially about inlet opening 22. A filter element 30 extends through each opening 28 and is supported by upper wall 16 at a peripheral shoulder 32. Each filter element is bag-shaped and has an open top end formed by a ring part 34. Filter elements 30 may be formed of a screen or similar generally rigid reticulated material, cloth or a similar flexible interwoven filtering material, or a combination of both a reticulated screen which serves as a shape retaining member and an interfitting interwoven filtering material. Each filter element 30 extends downwardly through its accommodating opening 28 with its ring part 34 being seated upon an upper wall shoulder 32 about the opening.

Figure 4:
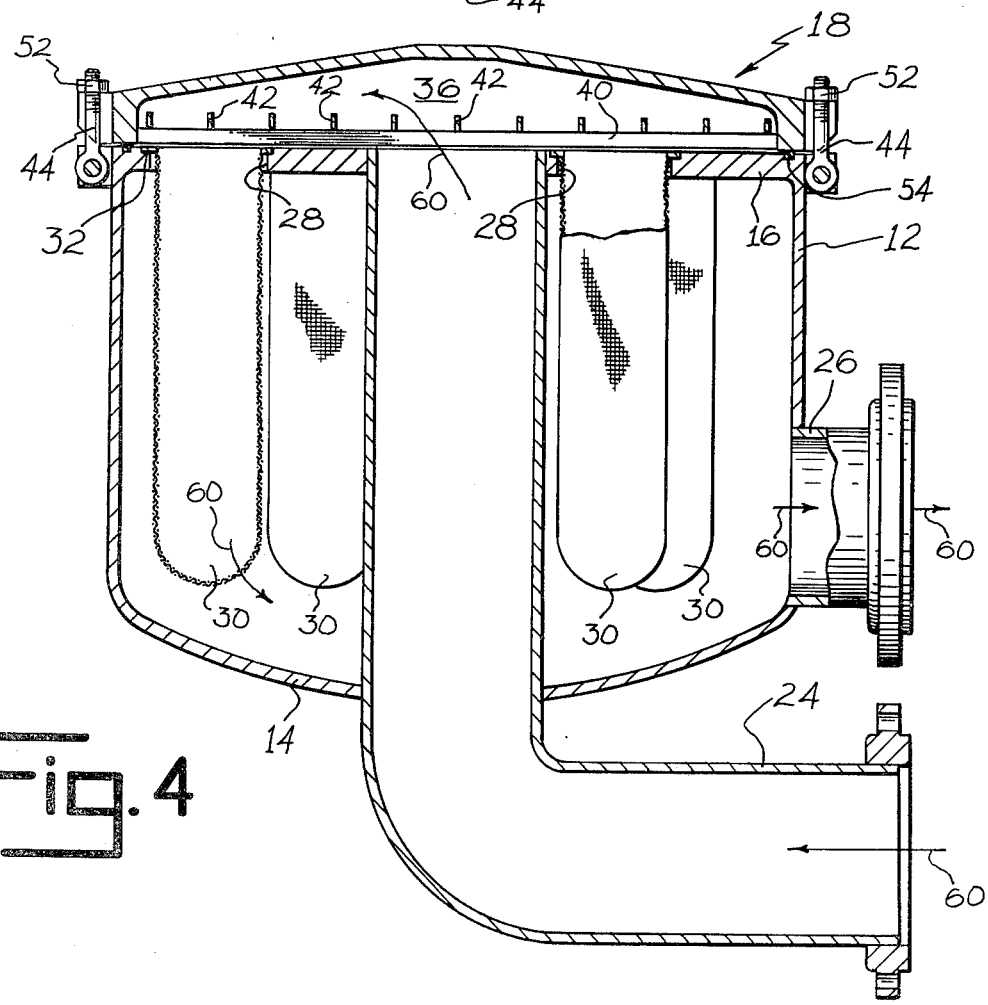
FIG. 4 is a sectional view of the filter taken along line 4—4 of FIG. 3 but with the cover closed.
Figure 5:
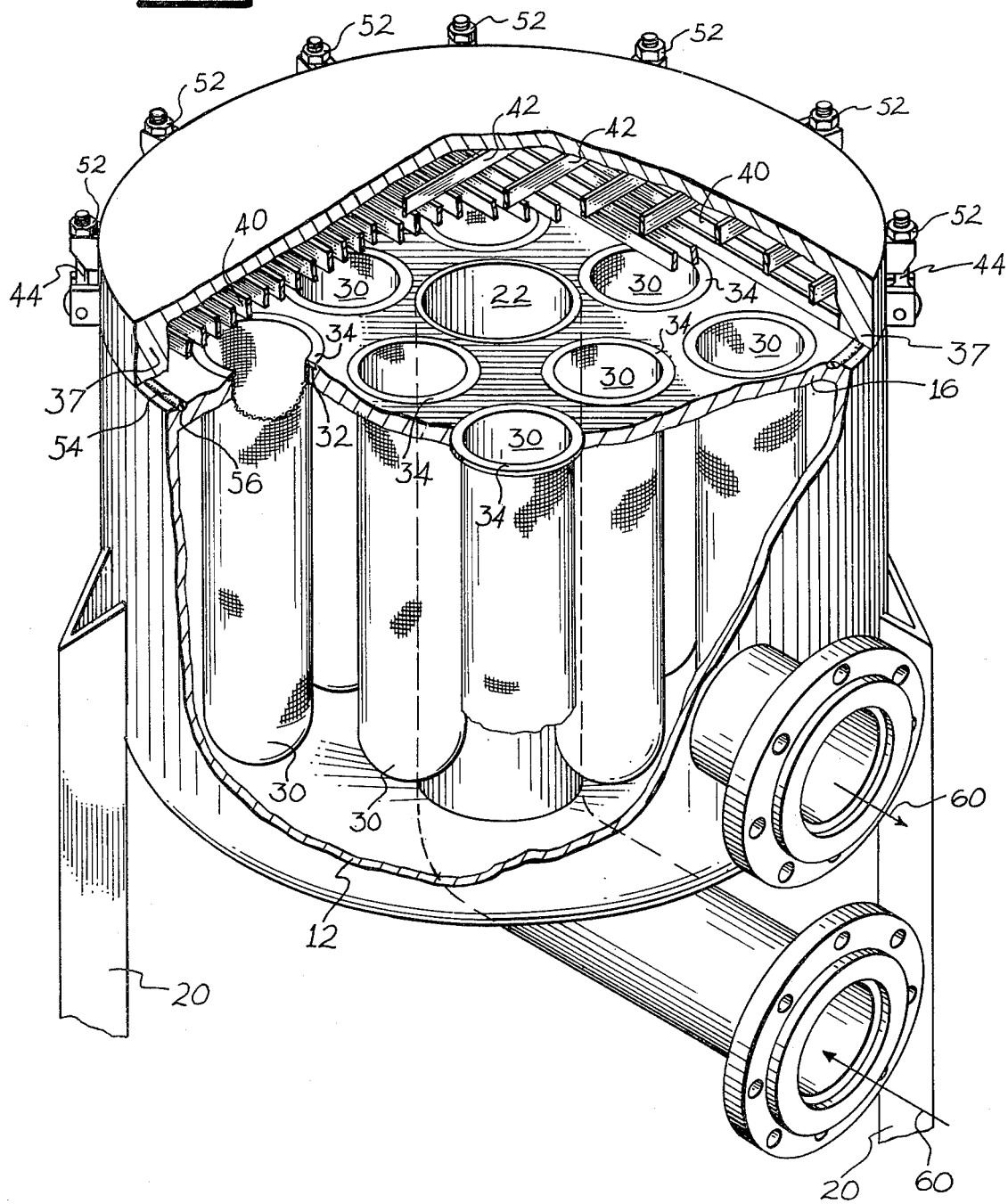
FIG. 5 is a perspective view of the filter with portions cut away for purposes of illustration.

Cover 18 spans upper wall 16 and has a dome-shaped inner cavity 36 which is located spacedly above the upper surface of upper wall 16. Cavity 36 is defined in part by a cover side wall 37. Side wall 37 is circular to accommodate cylindrical body side wall 12. Cover side wall 37 carries a grid 38. Grid 38 is attached at its circumference to cover side wall 37 and spans cavity 36. Grid 38 is formed by spaced parallel crossbars 40 which run lengthwise across the circumference of cavity 36 and spaced parallel crossbars 42 which overlie crossbars 40 and run lengthwise across the circumference of cavity 36 transverse to crossbars 40. Crossbars 40 and 42 form an open grid pattern. Grid 38 overlies ring parts 34 of filter elements 30 to hold the filter elements within openings 28 in body upper wall 16 when the cover is in its closed position, as best seen in FIG. 4.

Cover 18 is secured to body wall 12 by means of eyebolts 44 mounted to body side wall 12 and hold-down nuts 52 as shown. Leakage between cover 18 and the filter body is prevented by a continuous sealing member 54 located at the periphery of upper wall 16. Sealing member 54 may be formed of rubber or flexible plastic material and is seated in a circular groove 56 formed in upper wall 16.

In operation, as shown by arrows 60, liquid enters filter 10 by pipe 24 and flows upwardly in the pipe where it is discharged through opening 22 above upper wall 16 within cavity 36. The liquid then flows downwardly through grid 38 and filtering elements 30, into the interior of filter 10, and out through pipe 26. When it is desired to clean or replace one of filtering elements 30, nuts 52 are loosened, eyebolts 44 are pivoted out of engagement with cover 18 and the cover lifted from upper wall 16 of filter 10. Each filtering element can then be removed from each opening 28 and either cleaned, repaired or replaced in preparation for the next filtering operation.

It is to be understood that the invention is not to be limited to the details above given but may be modified within the scope of the appended claims.

What I claim is:

1. In a filter including a housing having side and bottom walls and a top wall, said housing top wall having at least two openings therein, filtering means for straining a liquid removably carried by said top wall within each opening therein, a cover including a lower peripheral edge and a dome-shaped inner face, said cover having a closed position spanning said housing top wall with the inner face thereof spaced from said filtering means, a liquid inlet in communication with said filtering means between said cover inner face and housing top wall whereby liquid can pass from the inlet into said filtering means and thereafter through the filtering means and into the interior of said housing and out an outlet therein, the improvement comprising grid means carried by said cover at its lower peripheral edge and spanning said inner face thereof, said grid means being positioned adjacent said filtering means for retaining the filtering means within said top wall openings when said cover is in its closed position, said grid means having openings therein to accommodate liquid flow from the inlet into the filtering means.

2. The filter of claim 1 wherein said grid means includes transversely oriented bars forming said grid means openings.

* * * * *